Nov. 24, 1970 C. J. GATZA Re. 26,987
PRESSURE VAPOR HEAT SYSTEM
Original Filed March 30, 1964
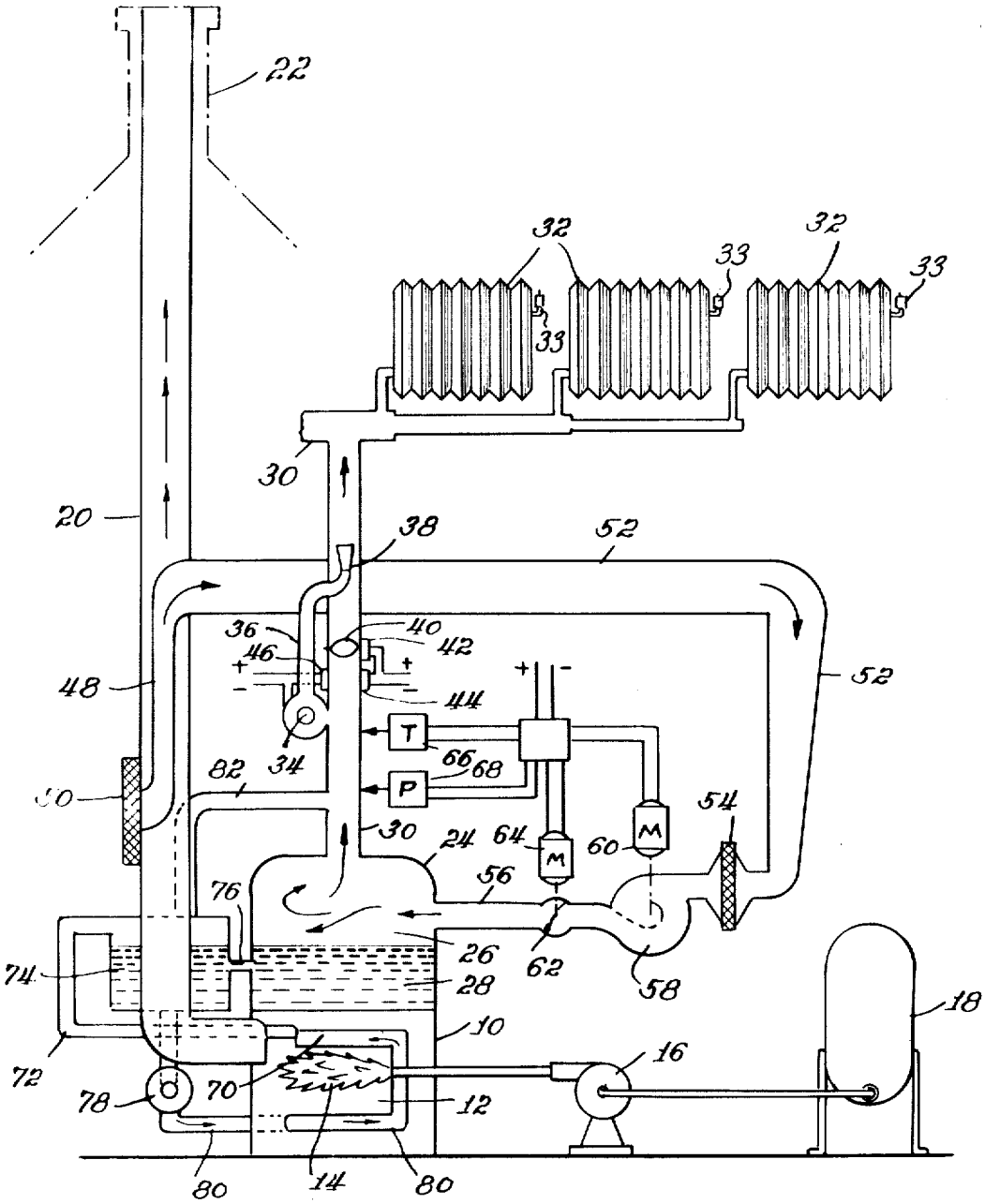
INVENTOR.
Casper J. Gatza
BY
Kent W. Worrell
Att'y.

United States Patent Office

Re. 26,987
Reissued Nov. 24, 1970

26,987

PRESSURE VAPOR HEAT SYSTEM

Casper J. Gatza, 118 N. Mayfield,
Chicago, Ill. 60644

Original No. 3,265,304, dated Aug. 9, 1966, Ser. No. 355,765, Mar. 30, 1964. Application for reissue Aug. 7, 1968, Ser. No. 754,163
Int. Cl. F24d *1/00*
U.S. Cl. 237—67 10 Claims

Matter enclosed in heavy brackets [ ] appears in the original patent but forms no part of this reissue specification; matter printed in italics indicates the additions made by reissue.

*ABSTRACT OF THE DISCLOSURE*

*This water-vapor heating system includes apparatus for heating ambient air in products of combustion and supplying the air thus heated to at least one radiator.*

This invention relates to a pressure vapor heat system as applied to ordinary heating plants for houses, apartments, hotels, factories, and other buildings using a common or central heating unit which supplies heat periodically or intermittently and is usually controlled by one or more thermostats.

An important object of the invention is to provide means in addition to an ordinary heating unit to supply additional heat in the form of vapor or steam in advance of, or more quickly than the regular heat supply from a heating furnace for that purpose, and in addition to the ordinary supply of heat, subject to the operation of one or more thermostats which automatically call for additional heat in some location.

Other objects of the invention are, to reduce smoke stack pressure, and dirt; to provide an air pump and filter for preheated air; to automatically open connections from the pump and to prevent back pressure; to reduce smog and noxious vapors by reducing smoke and stack pressure and thereby to effect more efficient heating operation and use of coal or oil.

Other and further objects of the invention will be found in the specification and will be more apparent in the accompanying drawings, in which:

The single drawing figure is a somewhat sectional and diagrammatic view of a heating plant having a vaporizer booster operating in accordance with this invention.

In the operation of an ordinary boiler heating system, heat may be supplied continuously or intermittently, either steam or hot air, but is often somewhat slow, or ponderous, in responding to a special or localized call for more heat by manual, or automatic means such as a thermostat. This invention provides means in the form of a vapor booster for more quickly supplying heat than from the main heating system, and thereby achieving all advantages which may result from the quick addition of a smaller body of heat which utilizes stack heat and pressure, and is applied to a particular part, or in fact to all of the devices which use the heat.

For many years the oil burner industry has been faced with the problem of making an efficient oil burner installation in a conversion job which means installing an oil burner in an ordinary cast iron boiler designed for coal firing. This may be done in various degrees by utilizing the vapor most effectively in the steam line in turning the heat off and on; by taking heat directly from the smoke stack and applying it to the vapor on top of the steam chamber in the boiler, and by quickly utilizing a portion of the heat obtained from an effective booster located in the fire box and usually interposed between the burner and the bottom of the boiler, delivering heat directly to the steam line leading to the radiators.

Referring now more particularly to the accompanying drawing, an ordinary steam heating boiler 10 is shown with a fire pot 12 has a burner 14 for oil from a motor 16 supplying it from a supply tank 18. Leading from the top of the fire pot is a stack 20 for hot flue gases which are usually dissipated or lost, the residue usually issuing from a chimney 22 in the form of smoke and hot gases.

At the top of the boiler is a dome 24 containing a reservoir 26 for hot water 28, with a steam and vapor pipe 30 leading therefrom to a number of heat radiators 32 each having an inlet from the pipe 30 at one end and an outlet discharge control valve 33 at the other end. A system of this kind is usually operated intermittently, continuously, or in response to ordinary thermostatic control which is not included. To this type of heating installation, the present invention is applied, particularly in a conversion installation for oil or gas as a fuel, using one or all of the methods for using steam vapor directly, heating it by stack gases, or with a booster.

If only a relatively small amount of heat correction is needed a pressure pump 34 may be connected by one end of a pipe 36 extending into the vapor pipe 30 for drawing vapors therefrom and blowing them out of the other end through a venturi 38 outwardly in the pipe 30. A butterfly valve 40 is located in the pipe 30 between the upper and lower ends of the pipe 36 and has an electric motor 42 outside of pipe 30 for opening and closing the valve.

A vapor pressure switch 44 is actuated by vapor or steam pressure in the pipe 30 and causes the butterfly valve 40 to operate on about one ounce or more of pressure to let steam vapors flow through. A temperature switch 46 is also located on the pipe 30 actuated by steam vapors therein at about 190° or more which leads to and starts the air pressure pump 34 to blow the vapors through the venturi 38.

This venturi releases the steam pressure from the pump 34 into the main pipe 30 and causes a partial vacuum on the lower pressure end of the pipe 30 line when the motorized butterfly valve 40 is closed.

Thus even a little pressure will cause the heat from the boiler in the steam vapor to initiate a flow of heating vapor to flow through this motor operated venturi by-pass to start supplying heat quickly and to maintain such a flow of heat when the main body water and steam is actually decreasing, thus tending to equalize the heating effect.

In utilizing heat from the stack 20, a heat-transfer pipe 48 preferably extends lengthwise therein with its lower end opening outwardly through a filter 50, and its upper end extending through the stack, with an outwardly and downwardly air projecting line tube 52 terminating in another filter 54. This filtered end is connected by a pipe 56 with the upper steam dome reservoir 26 through a pressure blower 58 having a motor 58, and through a check valve 62 having a motor 64.

The blower motor 64 takes filtered air from the tube 52 and delivers it through the motorized valve 62 under pressure to the reservoir 26 and is electrically controlled by a thermostat 66 and a pressure switch 68 both in direct contact with the interior of the main heating pipe 30. Motorized check valve 62 admits filtered air from the pump 64 to the steam boiler and pipe 30 and acts as a check valve to prevent air and steam from backing up on the blower 58 and is electrically controlled by the same thermostat 66 and pressure switch 68.

With this construction the stack temperature is imparted to the heat transfer pipe 48, and clean air is forced by the blower 58 into the main heating pipe 30 as controlled by the check valve 62, thus utilizing the temperature of the stack 20 gases for additional heating, reducing the stack temperature, and materially reducing the gases and smoke which passes out the chimney 22. A further and continuing supply of heat is thereby automatically supplied to the main heating pipe 30 and the radiator 32 utilizing the extra stack heat which would ordinarily be wasted, and continuing the heating effect supplied by the main heating boiler 10.

To more quickly supply heat a booster heat construction may be interposed in the fire pot 12 between the burner 14 and hot water 28 in the boiler, comprising a booster generator 70 usually composed of brass, copper, or some material which transfers heat more efficiently than cast iron or steel. This generator is connected at its top by a pipe 72 with the top of a steam vapor separator 74 which extends at one side of the boiler 10 and extends both above and below the upper surface line of water 28 therein, and has a water level equalizer connection 76 to maintain the same level in the boiler and vaporizer.

At the bottom of the vaporizer is a motor pump 78 connected to the booster generator 70 by a pipe 80, whereby water and vapor is forced by the pump through the booster generator 70 into the top of the separator 74 above the water level. A vapor or steam pipe 82 extends from the top of the separator 74 into the main heating pipe 30, and directs the vapor through this pipe, the water separating therefrom and dropping into the lower body of the separator 74.

The booster action is that steam is more quickly formed in the generator 70 mixed with water which is separated therefrom to allow the vapor to flow in pipe 82 to the main heater pipe 30 and to its radiators. With this construction heat is more quickly applied for use when the the burner is started, and until the main body of water in the boiler 10 becomes sufficiently heated to furnish steam or vapor. This is also more efficient use of the heat resulting in a more equal distribution, and actually shortening the running time and thereby reducing the amount of noxious gas, smoke, and air pollution.

This system lowers stack temperature 150 to 300 degrees from stacks that were 700 to 900 degrees. By absorbing heat the booster action is like a sponge taking up and transferring heat to the radiators in the shortest possible time, shortening the operating period of the burner, bringing more comfort in the rooms.

In this system a large portion of the heat produced is utilized, as obtained more quickly from the booster action, from the main boiler itself, from the heat of the stack, and from the heat of vapor before and after the production of steam, all resulting in prolonging or evening the heating effect. Steam has a temperature of about 212 degrees, but the vapor operation of this system may become and remain effective at about 190 degrees, thus resulting in a more even or ameliorating action resulting in greater comfort as well as preventing the loss of heat.

Each radiator 32 may be adjusted to allow more or less heat to pass therethrough, or to be closed, by its control valve 33.

While this system has been described in some detail with combined booster, stack reduction, and venturi vapor supply, in connection with a typical heating boiler operation, it should not be restricted in detail, as many other changes in the construction, combination and arrangement of the parts may be made without departing from the spirit and scope of the invention.

I claim:

1. In a one pipe pressure heat vapor system, the combination with a water heating boiler having a water dome, a fire box and a burner therein, a smoke stack extending from the fire box, and a main heating pipe with radiators connected to the boiler; of a heat booster generator between the burner and water in the dome, a separator for water and vapor, and a vapor connection to the said main heating pipe; a stack heater having a heat transfer member in the stack, and means for forcing heated air from the member into the top of the dome to heat vapors therein and force them into the main heating pipe; and a vapor pump connected to the main heating pipe with a motor to force steam vapor through a venturi into the said pipe at a temperature less than that of steam, to add its heating effect to the radiators; the booster, stack and vapor heaters all connected with the main heating pipe and adding their heating effect to that of the water heating boiler to prolong and equalize it, and to reduce the stack temperature which is due to the operation of the burner.

2. In a system in accordance with claim 1, the heat booster generator being connected with a vapor and water separator connected for water level with that of water in the dome, and having an upper delivery pipe from the generator, and a vapor pipe extending from the top of the separator to the main heating pipe to deliver vapor under pressure, the water being heavier and falling into the bottom of the separator, the booster acting more quickly in furnishing heat than the water in the boiler heated by the burner.

3. In a system in accordance with claim 1, the stack heater comprising a filtered air passage extending from the outside of the stack through and outside thereof and a motorized valve with thermostatic control means to it and to said means for forcing heated air through the valve when the stack sufficiently heats the air to add it to the top of the dome and said main heating pipe, the said valve closing to prevent air flowing backwardly through it, the heated air being forced into the main heating pipe to assist the heating effect of the heating boiler and its burner.

4. In a system in accordance with claim 1, the vapor pump being connected to the main heating pipe, and comprising a motorized butterfly valve in the pipe, and a passage comprising a venturi extending to opposite sides of the butterfly valve and having a driving motor connected to force vapor from the higher pressure side of said valve through the passage and venturi to the lower pressure side thereof adding to the usable heat in said main heating pipe at less than the actual steam forming temperature, and thermostatic means from the said main pipe to the butterfly valve motor and to said driving motor to add the heat thereof to the said main thereby equalizing the total heating effect on said radiators.

*5. The combination with a water-vapor heating system including a boiler, at least one radiator, a pipe connecting said boiler and said radiator, and a fuel burner operably associated with said boiler; of means forming a predetermined path of travel for ambient air, means in said path of travel for receiving heat of products of combustion from said burner for heating the ambient air, means associated with said path of travel and said pipe for supplying the heated air to said radiator, and means for venting air from said radiator.*

*6. The combination with a water-vapor heating system including a boiler, at least one radiator, a pipe connecting said boiler and said radiator, and a fuel burner operably associated with said boiler; of heat exchange means associated with said fuel burner for absorbing heat at generally the temperature of products of combustion issuing from said burner, means for separating water and water-vapor connected in water circulating relationship with said heat exchange means, and means for supplying water-vapor from said separating means to said radiator.*

*7. The combination set forth in claim 5, including power operated means associated with said pipe for establishing a subatmospheric pressure within said boiler to lower the boiling point of water therein, and means responsive to at least one condition indicative of the temperature of said water for controlling said power operated means.*

*8. The combination set forth in claim 5, including heat exchange means associated with said fuel burner for ab-*

*sorbing heat at generally the temperature of products of combustion issuing from said burner, means for separating water and water-vapor connected in water circulating relationship with said heat exchange means, and means for supplying water-vapor from said separating means to said radiator.*

*9. The combination set forth in claim 7, including heat exchange means associated with said fuel burner for absorbing heat at generally the temperature of products of combustion issuing from said burner, means for separating water and water-vapor connected in water circulating relationship with said heat exchange means, and means for supplying water-vapor from said separating means to said radiator.*

*10. The combination with a water vapor system including a boiler, at least one radiator, a pipe connecting said boiler and said radiator, and a fuel burner operably associated with said boiler; of power operated means associated with said pipe for establishing a subatmospheric pressure within said boiler to lower the boiling point of water therein, means responsive to at least one condition indicative of the temperature of said water for controlling said power operated means, heat exchange means associated with said fuel burner for absorbing heat at generally the temperature of products of combustion issuing from said burner, means for separating water and water vapor connected in water circulating relationship with said heat exchange means, and means for supplying water-vapor from said separating means to said radiator.*

References Cited

The following references, cited by the Examiner, are of record in the patented file of this patent or the original patent.

UNITED STATES PATENTS

| | | | |
|---|---|---|---|
| 1,802,383 | 4/1931 | Jarvis | 237—9 |
| 2,046,813 | 7/1936 | Dunham et al. | 237—12 |
| 2,103,770 | 12/1937 | Dunham et al. | 237—1 |
| 2,109,862 | 3/1938 | Kriechbaum | 236—11 X |
| 2,131,555 | 9/1938 | Dunham et al. | 237—67 |
| 2,193,160 | 3/1940 | Browne | 237—9 |
| 2,284,674 | 6/1942 | Murdock | 236—11 X |

EDWARD J. MICHAEL, Primary Examiner